United States Patent
Thompson (10) Patent No.: US 6,681,059 B1
(45) Date of Patent: Jan. 20, 2004

(54) METHOD AND APPARATUS FOR EFFICIENT VIDEO SCALING

(75) Inventor: Laurence A. Thompson, Saratoga, CA (US)

(73) Assignee: DVDO, Inc., Campbell, CA (US)

( * ) Notice: Subject to any disclaimer, the term of this patent is extended or adjusted under 35 U.S.C. 154(b) by 0 days.

(21) Appl. No.: 09/363,312

(22) Filed: Jul. 28, 1999

Related U.S. Application Data (60) Provisional application No. 60/094,390, filed on Jul. 28, 1998.

(51) Int. Cl.[7] .............................. G06K 9/32; H04N 9/74
(52) U.S. Cl. ........................ 382/298; 382/260; 348/581
(58) Field of Search ................................. 382/298, 264, 382/260, 251, 254; 708/313, 319, 208; 341/143; 345/660; 348/581, 561; 375/240.03; 358/1.2

(56) References Cited

U.S. PATENT DOCUMENTS

| | | | | |
|---|---|---|---|---|
| 4,542,475 A | * | 9/1985 | Acampora ................... 708/319 |
| 5,212,659 A | * | 5/1993 | Scott et al. .................. 708/313 |
| 5,347,314 A | | 9/1994 | Faroudja et al. |
| 5,471,534 A | * | 11/1995 | Utter ............................. 381/4 |
| 5,668,746 A | * | 9/1997 | Iwaki et al. ................. 708/317 |
| 5,742,346 A | * | 4/1998 | Sievers et al. .............. 348/420 |
| 5,831,880 A | * | 11/1998 | Lee ........................ 364/724.16 |
| 5,928,313 A | * | 7/1999 | Thompson ................... 708/313 |
| 6,014,682 A | * | 1/2000 | Stephen et al. ............. 708/313 |
| 6,034,733 A | | 3/2000 | Bairam et al. |
| 6,237,016 B1 | * | 5/2001 | Fischer et al. .............. 708/622 |
| 6,243,729 B1 | * | 6/2001 | Staszewski ................. 708/319 |
| 6,314,444 B1 | * | 11/2001 | Minuhin et al. ............ 708/819 |

OTHER PUBLICATIONS

Micron Technology Inc., *Technical Note, Achieve Maximum Compatibility In SDRAM/SGRAM Design,* Compatibility in SDRAM/SGRAM Design, May, 1997.
Micron Technology Inc., *Synchronous DRAM,* 16 MEG: ×16 SDRAM, Oct., 1997.

\* cited by examiner

*Primary Examiner*—Bhavesh M. Mehta
*Assistant Examiner*—Kanji Patel
(74) *Attorney, Agent, or Firm*—Perkins Coie LLP (57) ABSTRACT

A digital image processor is provided. The digital image processor includes a shift register having a number of serially connected registers. The shift register is receptive to an image data word signal and has a plurality of taps. A coefficient store provides a number of quantized coefficients in which the number of coefficients stored corresponds to an integer multiple of the taps. A number of multipliers are provided, each having a first input coupled to a tap of the shift register and having a second input coupled to the coefficient store to receive a coefficient to provide a number of multiplied output. An adder is coupled to the multiplied outputs, wherein the adder generates a filtered and scaled image data output signal.

12 Claims, 6 Drawing Sheets

| c0 | c1 | c2 | c3 | c4 | c5 | c6 | c7 | c8 | c9 | c10 | c11 | c12 | c13 | c14 | c15 | c16 | c17 |
|----|----|----|----|----|----|----|----|----|----|-----|-----|-----|-----|-----|-----|-----|-----|
| a | 0 | 0 | b | 0 | 0 | c | 0 | 0 | d | 0 | 0 | e | 0 | 0 | f | 0 | 0 |
| 0 | 0 | b | 0 | 0 | c | 0 | 0 | d | 0 | 0 | e | 0 | 0 | f | 0 | 0 | g |
| 0 | b | 0 | 0 | c | 0 | 0 | d | 0 | 0 | e | 0 | 0 | f | 0 | 0 | g | 0 |
| b | 0 | 0 | c | 0 | 0 | d | 0 | 0 | e | 0 | 0 | f | 0 | 0 | g | 0 | 0 |
| 0 | 0 | c | 0 | 0 | d | 0 | 0 | e | 0 | 0 | f | 0 | 0 | g | 0 | 0 | h |
| 0 | c | 0 | 0 | d | 0 | 0 | e | 0 | 0 | f | 0 | 0 | g | 0 | 0 | h | 0 |
| c | 0 | 0 | d | 0 | 0 | e | 0 | 0 | f | 0 | 0 | g | 0 | 0 | h | 0 | 0 |
| 0 | 0 | d | 0 | 0 | e | 0 | 0 | f | 0 | 0 | g | 0 | 0 | h | 0 | 0 | i |
| 0 | d | 0 | 0 | e | 0 | 0 | f | 0 | 0 | g | 0 | 0 | h | 0 | 0 | i | 0 |

FIG. 3
(PRIOR ART)

| UPSCALED BY 3 | COEFFICIENT SETS | DOWNSAMPLING BY 4 |
|---|---|---|
| c0 c3 c6 c9 c12 c15 / a b c d e f | set 0 | output |
| c2 c5 c8 c11 c14 c17 / b c d e f g | set 1 | drop |
| c1 c4 c7 c10 c13 c16 / b c d e f g | set 2 | drop |
| c0 c3 c6 c9 c12 c15 / b c d e f g | set 0 | drop |
| c2 c5 c8 c11 c14 c17 / c d e f g h | set 1 | output |
| c1 c4 c7 c10 c13 c16 / c d e f g h | set 2 | drop |
| c0 c3 c6 c9 c12 c15 / c d e f g h | set 0 | drop |
| c2 c5 c8 c11 c14 c17 / d e f g h i | set 1 | drop |
| c1 c4 c7 c10 c13 c16 / d e f g h i | set 2 | output |

$$\begin{cases} set(1) & c(1), c(9), c(17), c(25), c(33), c(41) \\ set(2) & c(2), c(10), c(18), c(26), c(34), c(42) \\ set(3) & c(3), c(11), c(19), c(27), c(35), c(43) \\ set(4) & c(4), c(12), c(20), c(28), c(36), c(44) \\ set(5) & c(5), c(13), c(21), c(29), c(37), c(45) \\ set(6) & c(6), c(14), c(22), c(30), c(38), c(46) \\ set(7) & c(7), c(15), c(23), c(31), c(39), c(47) \\ set(8) & c(8), c(16), c(24), c(32), c(40), c(48) \end{cases}$$

METHOD AND APPARATUS FOR EFFICIENT VIDEO SCALING

CROSS REFERENCE TO RELATED APPLICATIONS

This application claims the benefits of U.S. Patent Provisional Application No. 60/094,390 filed on Jul. 28, 1998, and is related to U.S. patent application Ser. No. 09/167,527 filed on Oct. 6, 1998, both of which are incorporated herein by reference.

BACKGROUND OF THE INVENTION

1. Field of the Invention

The present invention relates generally to digital video resizing or video image scaling technology and, more particularly, to techniques for reducing the cost and complexity of video scaling with minimal loss of perceived image quality.

2. Description of the Related Art

Video image scaling converts a digital or digitized image from one spatial resolution to another. For example, a digital image with a spatial resolution of 720 horizontal by 480 vertical pixels may have to be converted to another resolution in order to be displayed on a particular display device. Converting this image to, for example, a LCD panel with a fixed resolution of 640×480 requires horizontal scaling by the ratio 640/720, which is equivalent to 8/9.

This is an example of downscaling because the ratio is a fraction that is less than 1. Down-scaling creates fewer output samples than originally present in a given input. In contrast, scaling the same output to a panel of 800×600 would require horizontal scaling by 10/9 (800/720) and vertical scaling by the ratio 5/4 (600/480). These cases are examples of upscaling because the ratio is a fraction greater than 1.

Video scaling is type of digital sample rate conversion. A known technique of accomplishing video scaling is the multirate FIR (Finite Impulse Response) digital filter that achieves high quality sample rate conversion. However, this type of processing is computationally costly because it requires several multiplications and additions per output sample. When a real time processing requirement is added, the scaling function can consume a large amount of hardware resources and make it difficult to achieve high quality sample rate conversion at low cost.

FIR filters are one of two main classes of digital filters, the other being the well known IIR (Infinite Impulse Response) digital filter. Images may be thought of as signals, and like other complex signals, images typically are made up of many frequencies. High frequencies correspond to fine detail or sharpness and low frequencies correspond to smoothly or slowly changing image features.

Figure 1:
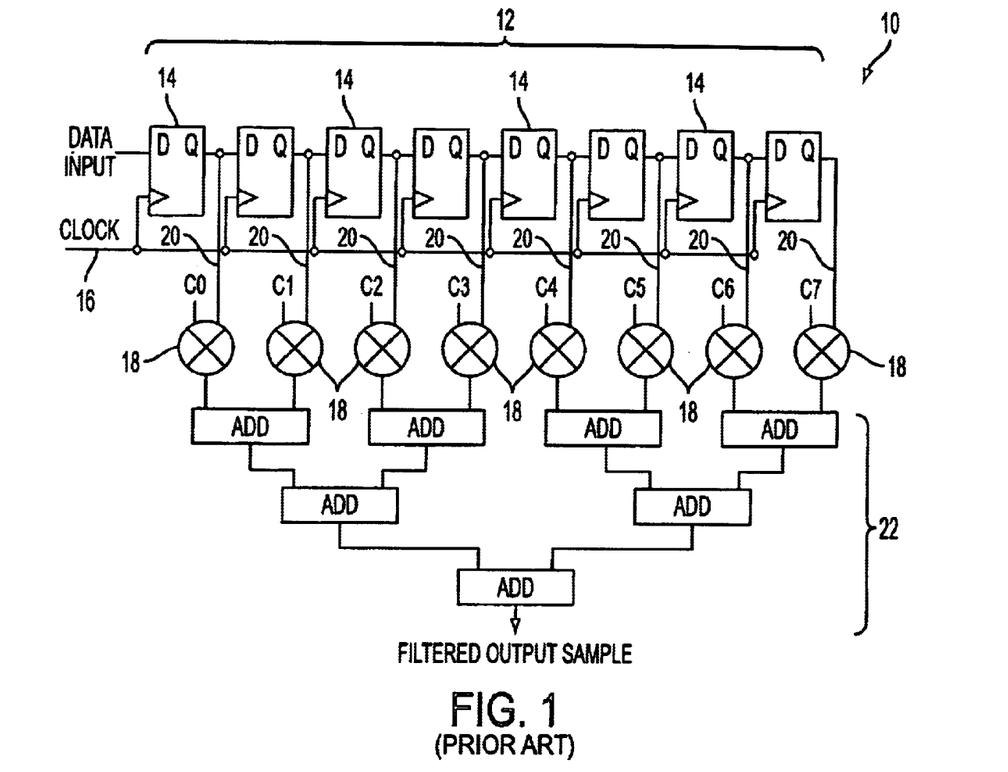
FIG. 1 is a diagram of a FIR filter.

FIG. 1 is a diagram illustrating a FIR filter 10 of the prior art. FIR filters 10 have a useful property, known as linear phase, which means that the delay through the filter is the same for all frequencies. Unequal delay results in distortion in the image, which is why FIR filters 10 are widely used in image processing applications. Linear phase results from symmetry of the filter's coefficients.

The FIR filter 10 includes shift register 12 with a series of data registers 14, each of which is connected to a clock 16. Each data register 14 is connected by one of a series of filter taps 20 to one of a series of multipliers 18. The multipliers 18 are connected to an adder 22. Data is input into the FIR filter 10 through the shift register 12. The output of each data register 14 is coupled by one of the series of filter taps 20 to one of a set of multipliers 18 to be multiplied by a unique coefficient C0–C7. The results from each multiplier 18 are then summed by the adder 22 to produce a filtered output sample.

The number of adjacent data samples input into the FIR filter 10 is equal to the number of filter taps 20 used and is application dependent. In general, higher performance requires a larger number of adjacent samples and therefore a larger number of filter taps 20. The multipliers 18 have coefficient symmetry because the coefficients on the left half mirror those on the right half, i.e. C3=C4; C2=C5; C1=C6; C0=C7.

As shown, FIR filter 10 has an even number of coefficients, but FIR filters may have either even or odd numbers of coefficients. FIR filter 10 may be used to implement many types of frequency responses, such as low-pass, high-pass, bandpass, etc. The type of response is determined by the number of coefficients and by the method used to calculate the coefficients. The design task for developing a low-pass FIR filter 10 is to determine the number of filter taps 20, which is performance and application dependent, determine its cutoff frequency, and then to calculate the filter's coefficients.

There are many ways to compute the filter's coefficients. One method is known as the Windowing method. For the application of processing 8-bit component digital video in a high quality consumer product, computing the coefficients with a Hamming window is an acceptable method. Given the number of taps and the filter's cutoff frequency, computing the coefficients for an even number of coefficients using the window method and a Hamming window can be done with the following Equation 1:

$$\sum_{i=1}^{m} c(i) = \frac{2fc}{2fc\pi(i-1/2)} * \sin[2fc\pi(i-1/2)] * \{0.54 + 0.46\cos[2\pi(i-1/2)/taps]\}$$

$m = taps/2$ ($m$ unique coefficients result from the filter's symmetry)

$i$ = iteration variable $fc$ = normalized cutoff frequency (cutoff frquency)/(sampling frequency) ranging from 0 to 0.5 Hz Scaling up by an integer (L) can be done directly with the FIR filter 10. Scaling down by 1/M (M is an integer) can also be done directly with the FIR filter 10. Video scaling typically requires scaling by a ratio of integers L/M. Scaling by a ratio is known as multirate filtering. Conceptually, it can be viewed as first upscaling by L then downscaling by M as shown in a method 24 in FIG. 2. First, a video stream 26 is input into the FIR filter 10. The FIR filter 10 then upscales by integer L as indicated at 28 to produce a data output by FIR filter 10 at a rate=fin*L as indicated at 30.

Figure 2:
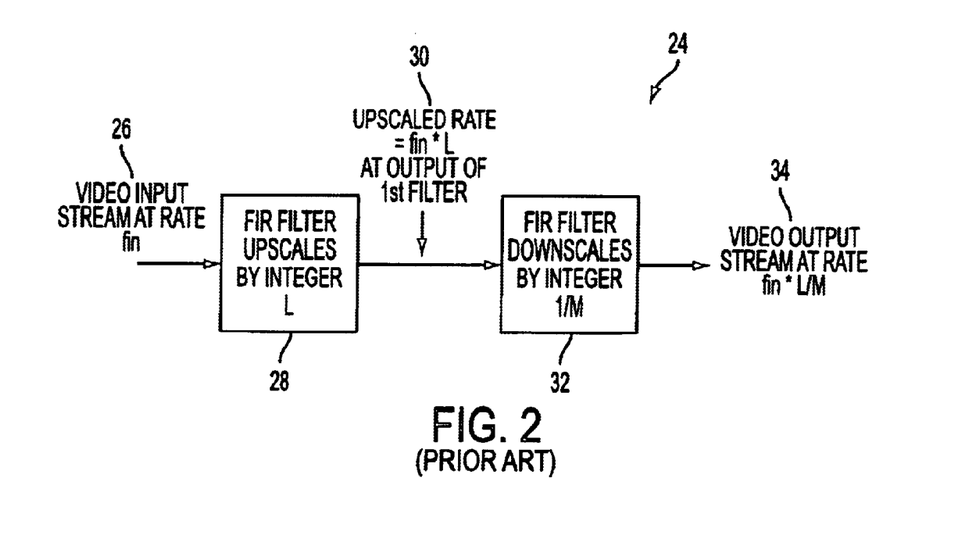
FIG. 2 is a flow chart of a method for upscaling and downscaling.

Next, the FIR filter 10 downscales by integer 1/M in act 32. This causes the video to be output at a rate=fin*L/M as shown at 34. The FIR filter 10 accomplishes downscaling by limiting the frequency content of the input stream to less than the cutoff frequency using the low pass FIR filter 10, then simply taking every $M^{th}$ sample and discarding the rest. After determining the number of taps, the downscaling filter's nominal normalized cutoff frequency is:

$$fc = \frac{1}{2M}.$$

Upscaling is more complicated. First the data stream is padded out with L−1 zero values between each input sample as shown in the example below. For L=3, if a, b, c, d, e represent a series of input data samples, the zero inserted stream becomes: a, 0, 0, b, 0, 0, c, 0, 0, d, 0, 0, e, 0, 0 . . . . This stream becomes the input to the FIR filter which is operating at a clock rate of L*fin. The padding out of zeros introduces a new frequency into the data stream, i.e. normalized introduced frequency $$= \frac{1}{2L}.$$

So the frequency content of the new zero padded stream consists of the original data stream plus the new frequency 1/(2L), which will always be the highest frequency in the zero padded stream. The job of the FIR filter 10 is to remove the 1/(2L) frequency and distribute the energy of the non-zero samples over all the output samples. The cutoff frequency then becomes fc=1/(2L). In addition, the energy level of the input stream must be raised by L times (because of the averaging with zero that occurs in the filter). The result is that each coefficient in Equation 1 must be multiplied by L so the coefficient calculation gives us Equation 2:

$$\sum_{i=1}^{m} c(i) = \frac{2Lfc}{2fc\pi(i-1/2)} * \sin[2 fc\pi(i-1/2)] * \{0.54 + 0.46\cos[2\pi(i-1/2)/taps]\}$$

As a practical matter, padding out a video data stream with zeros is difficult because of the large number of pixels produced at the output of the upscaling FIR filter 10. This is especially true for video processing. For example, if the input data rate to a filter is 13.5 million samples/sec, and the scaling ratio is 8/9, then the output of the upscaling FIR filter 10 is 13.5M*8=108 million samples/sec, so a real-life implementation becomes costly. Most of those samples would be discarded in the downsampling stage where 1/M=1/9 to reduce the data rate to 12 million samples/sec. Fortunately, there are techniques for converting directly from the 13.5 Ms/sec to 12 Ms/sec without the intermediate stage.

Multirate filtering is also referred to as polyphase filtering. In standard FIR filters, coefficients are fixed, but in polyphase filters, the coefficients change every time a new data set is input. For example, see *Multirate Digital Signal Processing* by Ronald Crochiere and Lawrence Rabiner, Section 3.3.4: "FIR Structures with Time Varying Coefficients for Interpolation/Decimation by a Factor of L/M.

If the number of filter taps is chosen so that number of taps=L*mults where L is the numerator of the scaling ratio L/M, and mults is a number of multiplies, then the multirate problem becomes much simpler. For example, suppose the number of multipliers chosen by the filter designer is 6 and the scaling ratio L/M=3/4. Then the number of taps in the FIR filter 10 would be taps=L*mults=3*6=18.

Figure 3:
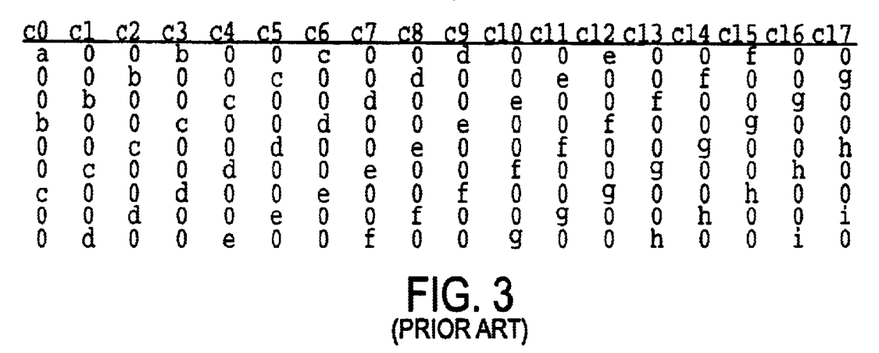
FIG. 3 is a table of data shifting through the FIR filter on each clock cycle.

Suppose a, b, c, d, e represents a data stream which is padded out with L−1 or 2 zeros between each input sample: a, 0, 0, b, 0, 0, c, 0, 0, d, 0, 0, e, 0, 0 . . . . Also, suppose the 18 coefficients are numbered c0 through c17 and the zero padded data is shifted through the filter. Each line represents the data shifting through the filter from right to left on each clock cycle as shown in FIG. 3.

Figure 4:
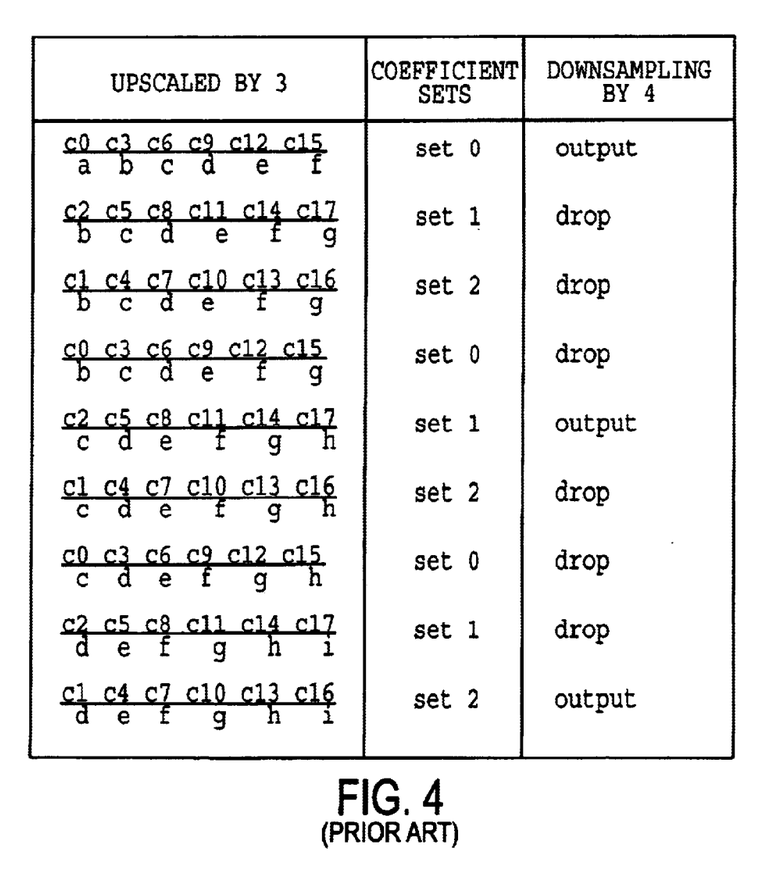
FIG. 4 is a table of the organization of the coefficients into 3 repeating sets of 6 coefficients per set.

Considering that the zero values will produce a zero output at the multiplier, it is clear that only the coefficients that have real data values a, b, d, e . . . actually need to be computed. In addition, FIG. 3 shows upscaling by 3, to downscale by 4, only every 4th output is taken. FIG. 4 is organization of the coefficients into 3 repeating sets of 6 coefficients per set. To further simplify the scaler, it is only necessary to compute the samples marked OUTPUT in FIG. 4.

The process of the prior art for scaling is as follows is first to determine the scaling ratio L/M. Then the number of multiplies is decided. The number is application dependent. In general, more multiplies improves quality but adds cost. Excellent quality has been achieved with six multiplies in consumer video applications. Next, the number of filter taps 20: taps=L*mults and the filter's nominal cutoff frequency fc is computed. If L/M<1, then fc=1/(2M). If L/M>1, then fc=1/(2L). The FIR filter 10 coefficients are computed using Equation 2, which are then organized into L sets of mult coefficients per set. Finally, the output pixels are computed.

The technique produces high quality results, but can be costly and complex to implement in a low-cost real-time hardware processor because hardware multipliers are expensive and bulky, with both size and cost being dependent on the number of bits used to quantize the filter's coefficients. For example, an 8×8 multiplier is twice as large as an 8×4 multiplier. The prior art requires 8–12 bits of precision for the filter coefficients. The prior art also requires 6 or more multiplies for each of the 3 video components Cb, Cr, Y, i.e. 18 multiplies per output pixel. If both horizontal and vertical scaling is done, then the number of multiplies required is doubled.

For a hardware implementation, the coefficients must be quantized to some number of bits, the number is application dependent, but for a high quality video application, 8 bits are the minimum, 10 bits are better. The number of coefficients bits correlate directly to the cost of the hardware multipliers.

In view of the foregoing, it is desirable to have a method that provides for quantizing filter coefficients to a reduced number of bits in video scaling of digital images in order to lower the cost of the process and decrease the bulk of the chip without noticeably degrading the image quality.

SUMMARY OF THE INVENTION

The present invention fills these needs by providing an efficient and economical method and apparatus for video scaling. It should be appreciated that the present invention can be implemented in numerous ways, including as a process, an apparatus, a system, a device or a method. Several inventive embodiments of the present invention are described below.

In one embodiment of the present invention, a digital image processor is provided. The digital image processor includes a shift register having a number of serially connected registers. The shift register is receptive to an image data word signal and has a plurality of taps. A coefficient store provides a number of quantized coefficients in which the number of coefficients stored corresponds to an integer multiple of the taps. A number of multipliers are provided, each having a first input coupled to a tap of the shift register and having a second input coupled to the coefficient store to receive a coefficient to provide a number of multiplied outputs. An adder is coupled to the multiplied outputs, wherein the adder generates a filtered and scaled image data output signal.

In another embodiment of the present invention, a method of processing a digital image is provided. The method includes inputting image data into a shift register to form a set of data words. The data words are then multiplied with a quantized coefficient produced by a coefficient generator to produce a series of multiplied outputs, where the number of quantized coefficients corresponds to an integer multiple of a number of taps. The series of multiplied outputs are then added to generate a filtered and scaled image data output.

In yet another embodiment of the present invention, a method for developing FIR coefficients is provided. The method includes developing a number of coefficients for low pass filter with desired parameters. The coefficients are then organized into L sets of coefficients, where each set includes a number M of elements corresponding to an integer multiple of a number of taps. The L sets of coefficients are then processed and stored into a coefficient store.

An advantage of the present invention is that it provides for a hardware scheme and coefficient generator that allows for variable scaling of digital images by using reduced bits of precision (e.g. 4 bits of precision) as opposed to 8–12 bits of precision required by the prior art. Because both the cost and the size of the multiplier is proportional to the number of bits multiplied, the present invention is able to reduce the cost of variable scaling as well as reducing the size of the chip.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENT

A method and apparatus for efficient video scaling is disclosed. In the following description, numerous specific details are set forth in order to provide a thorough understanding of the present invention. It will be understood, however, to one skilled in the art, that the present invention may be practiced without some or all of these specific details. In other instances, well known process acts have not been described in detail in order not to unnecessarily obscure the present invention.

Figure 5:
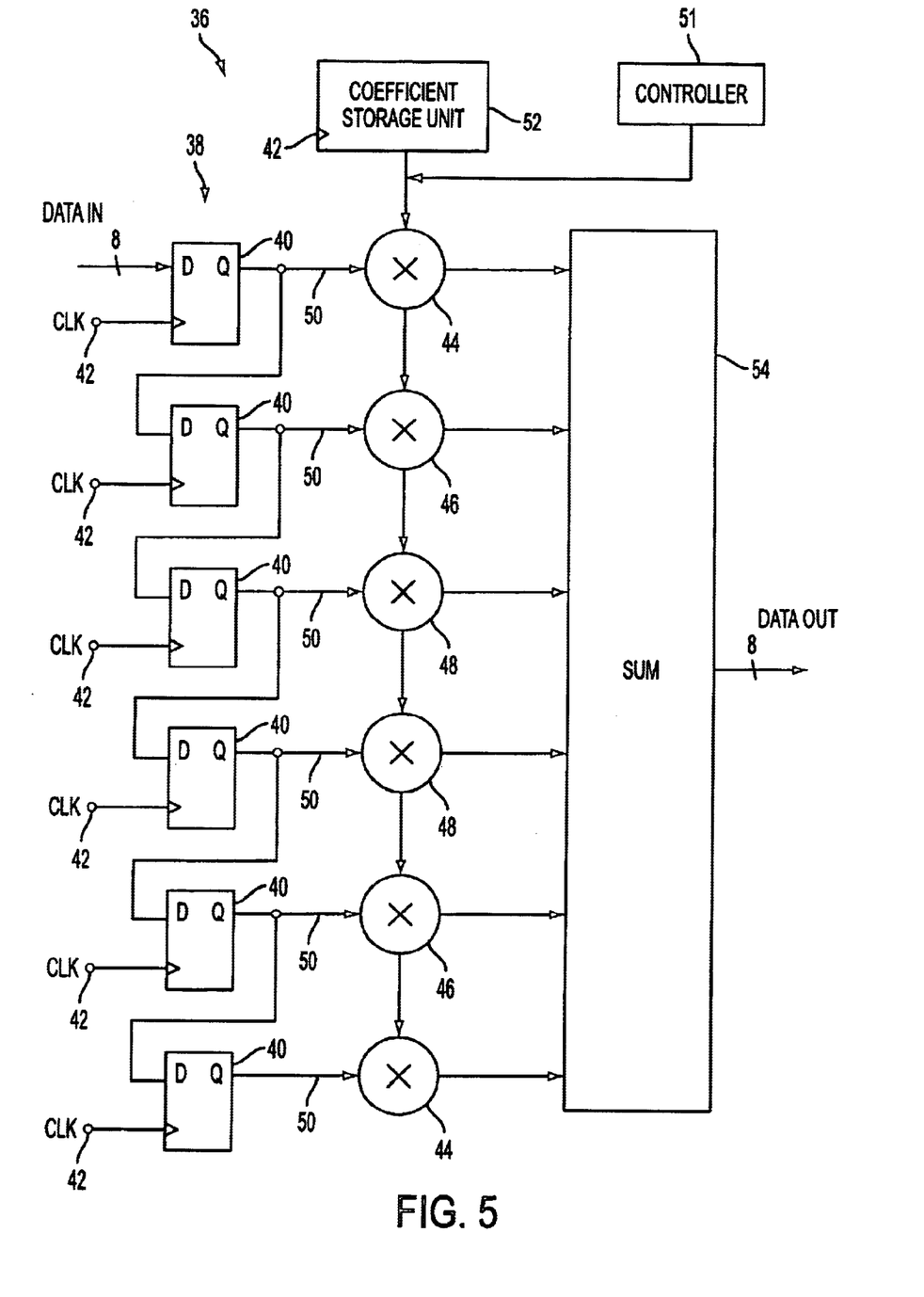
FIG. 5 is an example of a variable scaling FIR filter.

FIGS. 1–4 were discussed with reference to the prior art. FIG. 5 shows an example of a variable scaling FIR filter 36 of the present invention. The variable scaling FIR filter 36 includes a shift register 38 with a series of registers 40 each of which is connected to a clock CLK 42. Each register 40 is connected to one of a set of multipliers 44, 46, and 48 by one of a series of filter taps 50. Multipliers 44, 46, and 48 accept two inputs to be multiplied. The first input is an eight-bit data word, and the second input is a coefficient flow controlled by a controller 51. Multipliers 44, 46, and 48 differ from each other in that they accept coefficients quantized to different numbers of bits. Multipliers 44 use the least number of bits per coefficient and multipliers 48 use the most bits per coefficient. Multipliers 44, 46, and 48 are connected to the controller 51, a coefficient store 52 and an adder 54.

Eight bits of data in input into the variable scaling FIR filter 36 through the shift register 38. The output of each register 40 is coupled by one of a series of filter taps 50 to one of a set of multipliers 44, 46, and 48 to be multiplied by a coefficient produced by the coefficient storage unit 52. A new set of coefficients regulated by the controller 51 is entered into the multipliers 44, 46, and 48 by the coefficient storage unit 52 on each clock 42. The controller 51 is receptive to a pre-determined scaling ratio L/M, which controls the flow of coefficients from the coefficient store 52 to the multipliers 44, 46, and 48 such that L sequential output data samples are computed from M sequential input samples. The results from each multiplier 44, 46, and 48 are summed by the adder 54 to produce a filtered output sample.

Figure 6:
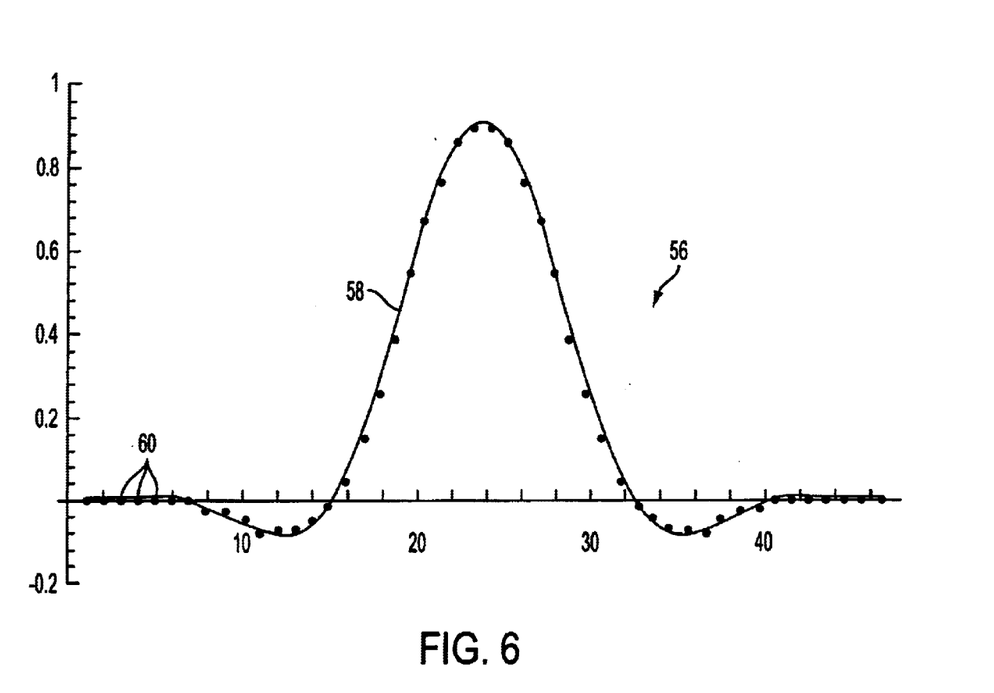
FIG. 6 is a graph of low-pass filter coefficients in the time domain.

FIG. 6 is a graph of low-pass filter coefficients 56 in the time domain stored in the coefficient storage unit 52 to produce coefficients. The low-pass filter coefficients 56 are represented by Equation 2, and the unquantized and continuous wave is represented by curve 58. Filter coefficients 60 are shown in 56 plotted on or near curve 58. Some coefficients 60 appear slightly off the curve due to the error introduced by quantizing each coefficient to a limited number of bits.

Figure 7:
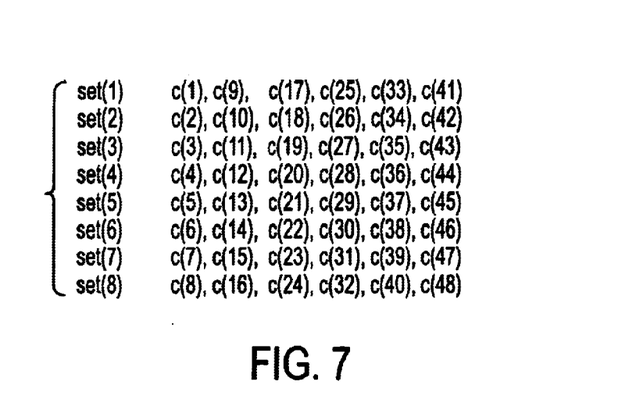
FIG. 7 is a table of coefficients organized into L sets of mults per set.

FIG. 7 shows the coefficients 60 organized into L=8 sets of mults=6 coefficients per set. The sum of all the coefficients in each set i where i=1 to L is represented by an Equation 3:

$$\sum_{j=1}^{j=mults} s(i) = \sum_{j=1}^{j=mults} cL(j-1)$$

Figure 8:
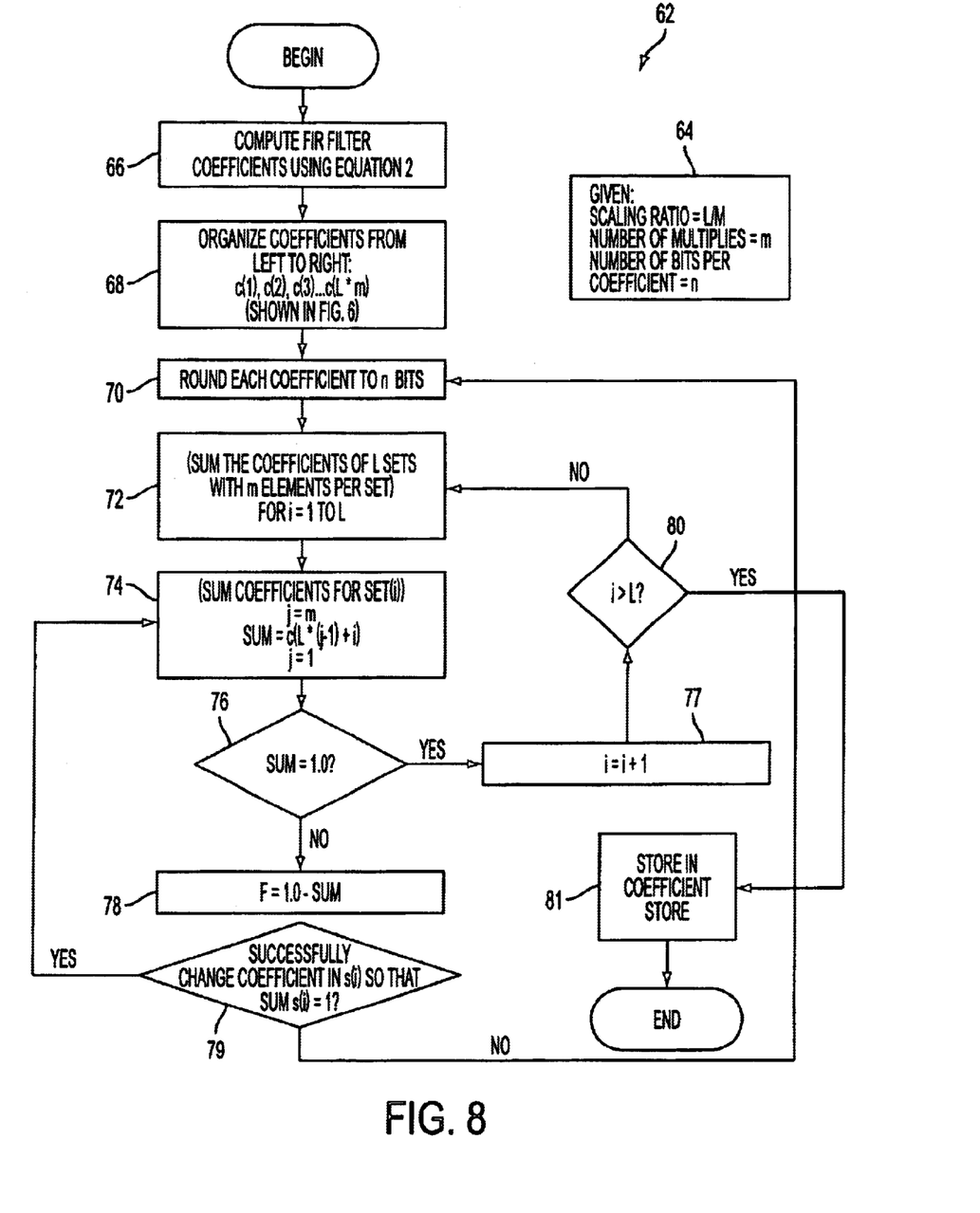
FIG. 8 is a flow chart of a method for quantization of FIR coefficients in accordance with the present invention.

FIG. 8 is a flow chart of a method 62 for quantizing coefficients. The method 62 initializes with a given set of parameters 64 needed to compute the coefficients where L is the numerator of the scaling ratio L/M; mults is the number of multiplies used in the FIR filter; and n is the number of bits to which the coefficients will be quantized. An act 66 uses the parameters to compute the FIR filter coefficients using Equation 2. Then, in an act 68, the coefficients are organized from left to right and labeled c(1), c(2), c(3), ... c(L*mults).

In an act 70, each coefficient is quantized to n number of bits by rounding. Next, an act 72 starts a loop which is executed L times, one time for each coefficient set, in which all the coefficients in each set is summed. An act 74 sums the coefficients for set(i) represented in FIG. 7. Then, an act 76 tests the result of the summing act 74 for a 1.0 result. If act 76 produces a false result, then a Fudge value F is computed in an act 78 by subtracting the sum produced in act 74 from 1.0. Then, processing proceeds to an act 79 which determines whether the coefficient in s(i) was successfully changed so that sum s(i)=1.0. If the sum s(i)=0.0, then method 62 returns to act 74. If not, method 62 returns to act 70. If act 76 produces a true result, then no further processing is done. The loop iterator is incremented in an act 77, and an act 80 determines whether i>L. If i>L, then an act 81 stores the coefficient in a coefficient store, and method 62 ends. If not, method 62 returns to act 72.

Figure 9:
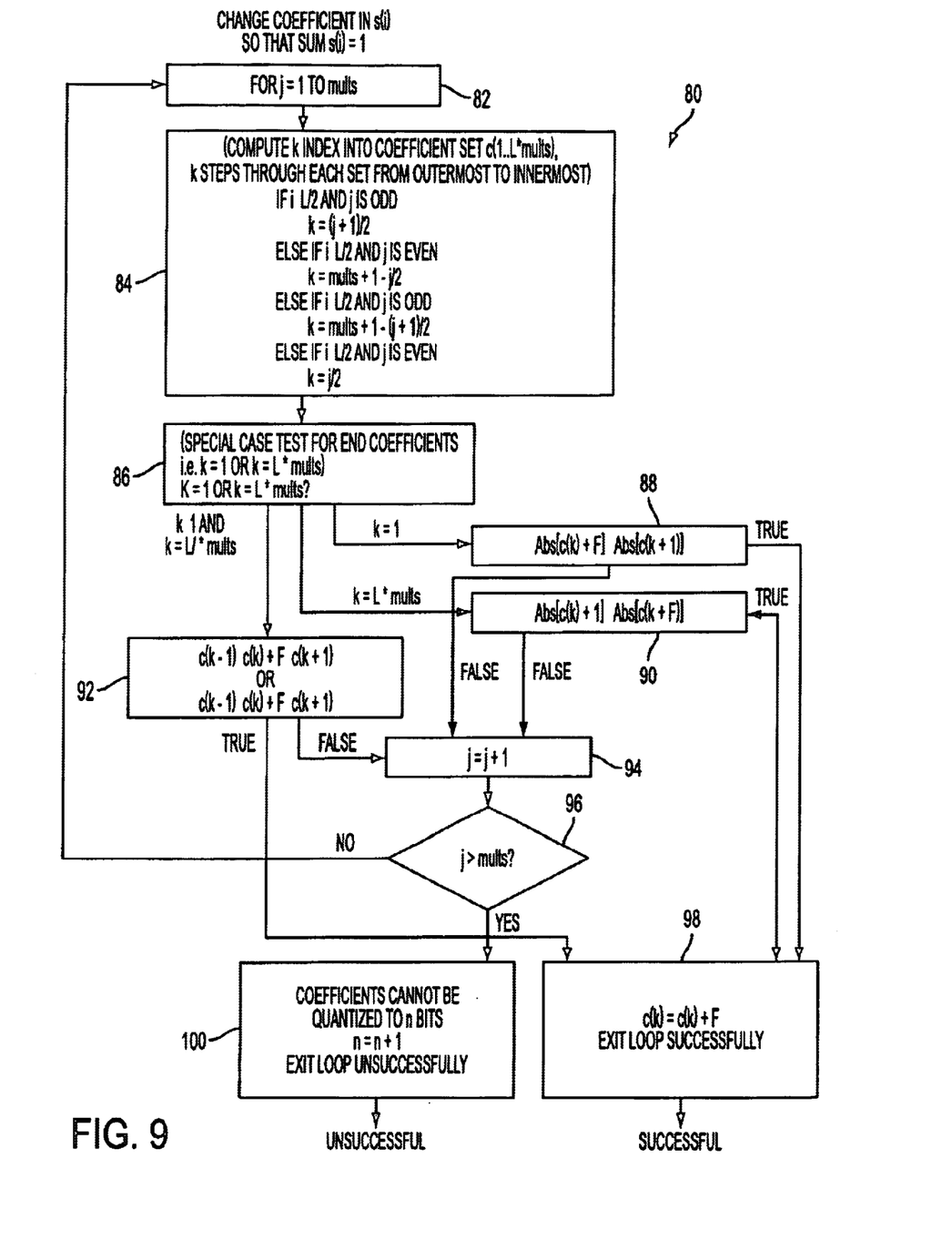
FIG. 9 is a flow chart of a method for changing coefficients in accordance with the present invention.

FIG. 9 is a flow chart of the act 80 from FIG. 8 in greater detail. An act 82 is loop set up to step through the coefficients of s(i) in a particular order. The order starts with the outermost coefficient of the set s(i), and then moves toward the center of the set. Act 82 is executed mults times, because there are mults number of coefficients per set. Next, an index k is computed in an act 84, which is used to process the coefficients in the previously stated order.

The coefficients at the left or right edge of the coefficient set must be handled as a special case. Therefore, an act 86 is performed on the index k to determine whether the coefficient to be processed is either the first coefficient, c(1) or the last coefficient c(L*mults). If act 86 determines that the coefficient to be adjusted is the leftmost one, that is, c(1), then an act 88 is performed.

Act 88 evaluates whether the absolute value of the sum of c(1) and F is less than or equal to the absolute value of the coefficient to the right of c(1). This means that c(k+1)≦c(2). If the result is true, then c(1) can be adjusted by adding F without creating a discontinuity or divergence from the zero axis. The coefficient is adjusted in an act 98, and act 80 is exited successfully. If the result is false, then act 94 performs a loop iteration.

If act 86 determines that the coefficient to be adjusted is the rightmost one, that is, c(L*mults), then the method proceeds to an act 90. Act 90 evaluates whether the absolute value of the sum of c(L*mults) and F is less than or equal to the absolute value of the coefficient to the left of c(L*mults), that is, c(L*mults−1). If the result is true, then c(L*mults) can be adjusted by adding F without creating a discontinuity or divergence from the zero axis. The coefficient is adjusted in 98, and act 80 is exited successfully. If the act 90 result is false, then a loop iteration is performed in act 94.

If act 86 determines that the coefficient to be adjusted is neither the leftmost or rightmost one, then an act 92 is performed. Act 92 evaluates whether the sum of c(k) and F is outside the limits of the coefficients on the left and right, that is c(k−1) and c(k+1), by evaluating the equations c(k−1)≦c(k)≦c(k+1) and c(k−1)≧c(k)≧c(k+1). If either of the equations is true, then the coefficient c(k) is set equal to c(k)+F in act 98 and a discontinuity is not introduced. Therefore, act 80 is successfully exited. If either of the equations is false, then a loop iteration is performed in act 94.

Act 94 increments the loop iterator variable so the next coefficient can be evaluated. An act 96 determines whether all the coefficients in the set s(i) have been evaluated. If all the coefficients in s(i) have not been evaluated, then control is passed to the top of the loop 82 and the procedure is repeated for the next coefficient. If all the coefficients in s(i) have been evaluated, then the coefficient set cannot be quantized to n bits without introducing an unacceptable discontinuity into the coefficient set. Therefore, n is incremented in an act 100 and act 80 is exited. Control is returned to the method 62 at act 70 where the original coefficients are quantized to the new value of n and the process is repeated.

In the cases where act 80 is successfully exited, control is returned to loop 62 at act 74 and the next coefficient set s(i) is evaluated.

It will therefore be appreciated that the present invention provides a method and apparatus for efficient video scaling. The invention has been described herein in terms of several preferred embodiments. For example, in one embodiment of the present invention, scalers follow a polyphase model, with a unique technique to overcome the limitations of the prior art. Coefficients are quantized to a small number of bits without noticeable degradation.

Quantization reduction requires reducing the number of bits used for each coefficient. Artifacts from the reduced coefficient resolution are most noticeable for low frequencies. Therefore, errors introduced by quantization to a small number of bits are shifted to higher frequencies where they become insignificant. This is achieved by adjusting coefficient values such that the sum of the coefficients for each phase or set is in unity.

First, the number of taps fc, and coefficients are computed. Then, the coefficients are organized into L sets of mults coefficients per set. The coefficients are then quantized to a predetermined number of bits by rounding (rather than truncation) to minimize errors. Finally, the sets are summed. If a set sums to one, nothing else is required. If the set does not sum to one, the error will typically be no more than 2/bits (the number of bits chosen for the quantization).

One coefficient must be chosen and adjusted until the sum of the set is 1. The coefficient chosen to be adjusted should be as close as possible to the outer edges of the coefficient set. In addition, the adjustment should not introduce a discontinuity in the coefficient set. Finally, the coefficient quantization should be reduced for leading zeros. This results in a variable number of coefficients per multiplier.

Other embodiments of the invention will be apparent to those skilled in the art from consideration of the specification and practice of the invention. Furthermore, certain terminology has been used for the purposes of descriptive clarity, and not to limit the present invention. The embodiments and preferred features described above should be considered exemplary, with the invention being defined by the appended claims.

What is claimed is:

1. A digital image processor comprising:

a shift register having a plurality of serially connected registers, said shift register being receptive to an image data word signal and having a plurality of taps;

a coefficient store providing a number of quantized coefficients in which the number of coefficients stored corresponds to an integer multiple of said taps of said shift register, wherein the coefficient store rounds each of the quantized coefficients to n bits and sums the quantized coefficients to provide a summed coefficient, and wherein the coefficient store adjusts the value of the quantized coefficients in a predetermined order until generating an adjusted summed coefficient equal to a predetermined value, and wherein the coefficient store determines the suitability of a quantization value n in which the sum of the adjusted summed coefficient fails to equal the predetermined value after each member of the set has been adjusted;

a plurality of multipliers each having a first input coupled to a tap of said shift register and having a second input coupled to said coefficient store to receive a coefficient to provide a plurality of multiplied outputs;

an adder coupled to said plurality of multiplied outputs, wherein said adder generates a filtered and scaled image data output signal; and a controller receptive to a pre-determined scaling ratio L/M, which controls the second input of quantized coefficients from the coefficient store to the multipliers such that L sequential output data samples are computed from M sequential input samples.

2. A digital image processor as recited in claim 1, wherein the coefficient store organizes the quantized coefficients from left to right: c(1), c(2), c(3) . . . c(L multiplied by mults) wherein mults is a number of multiplies.

3. A method of processing a digital image, comprising:
   inputting image data into a shift register to form a set of data words;
   multiplying said set of data words with a quantized coefficient produced by a coefficient generator and a controller receptive to a pre-determined scaling ratio L/M which controls the quantized coefficient to produce a series of multiplied outputs, wherein L quantized coefficients corresponds to M taps;
   adding said series of multiplied outputs to generate a filtered and scaled image data output;
   rounding each coefficient to n bits;
   summing the coefficients to provide a summed coefficient;
   comparing the summed coefficient to a predetermined value;
   adjusting the value of each coefficient in a predetermined order until an adjusted summed coefficient of the set of coefficients is equal to said predetermined value; and
   determining the suitability of a quantization value n in which the sum of a set of coefficients fails to equal the predetermined value after each member of the set has been adjusted.

4. A method of processing a digital image as recited in claim 3, further comprising:
   organizing the coefficients into L sets of coefficients is accomplished by organizing the coefficients from left to right: c(1), c(2), c(3) . . . c(L multiplied by mults) wherein mults is a number of multiplies.

5. A method of processing a digital image as recited in claim 3, further comprising:
   determining whether the adjusted summed coefficient falls within limits imposed by a coefficient organized on a side of the adjusted summed coefficient.

6. A method of processing a digital image as recited in claim 3, further comprising:
   selecting coefficients whose value will be adjusted in which the order of the coefficients selected for adjustment depends on its position within the set c(1), c(2) . . . c(L multiplied by mults) wherein mults is the number of multiplies, where the first coefficient selected is the one closest to either c(1) or c(L multiplied by mults) wherein mults is the number of multiplies.

7. A method of processing a digital image as recited in claim 3, further comprising:
   selecting a second coefficient for adjustment, where the second coefficient is the second closest to c(1) or c(L multiplied by mults) wherein mults is the number of multiplies.

8. A method for developing FIR coefficients comprising:
   developing a number of coefficients for low pass filter with desired parameters;
   organizing said coefficients into L sets of coefficients, where each set includes a number M of elements corresponding to an integer multiple of a number of taps;
   processing said L sets of coefficients;
   storing said L sets of coefficients in a coefficient store;
   rounding each coefficient to n bits;
   summing the coefficients to provide a summed coefficient;
   comparing the summed coefficient to a predetermined value;
   adjusting the value of each coefficient in a predetermined order until an adjusted summed coefficient of the set of coefficients is equal to said predetermined value; and
   determining the suitability of a quantization value n in which the sum of a set of coefficients fails to equal the predetermined value after each member of the set has been adjusted.

9. A method for developing FIR coefficients as recited in claim 8, wherein organizing the coefficients into L sets of coefficients is accomplished by organizing the coefficients from left to right: c(1), c(2), c(3) . . . c(L multiplied by mults) wherein mults is a number of multiplies.

10. A method for developing FIR coefficients as recited in claim 8, further comprising:
    determining whether the adjusted summed coefficient falls within limits imposed by a coefficient organized on a side of the adjusted summed coefficient.

11. A method for developing FIR coefficients as recited in claim 8, further comprising:
    selecting coefficients whose value will be adjusted in which the order of the coefficients selected for adjustment depends on its position within the set c(1), c(2) . . . [c(L*mults)]c(L multiplied by mults) wherein mults is a number of multiplies, where the first coefficient selected is the one closest to either c(1) or c(L multiplied by mults).

12. A method for developing FIR coefficients as recited in claim 8, further comprising:
    selecting a second coefficient for adjustment, where the second coefficient is the second closest to c(1) or c(L multiplied by mults).

* * * * *